United States Patent Office 3,551,965
Patented Jan. 5, 1971

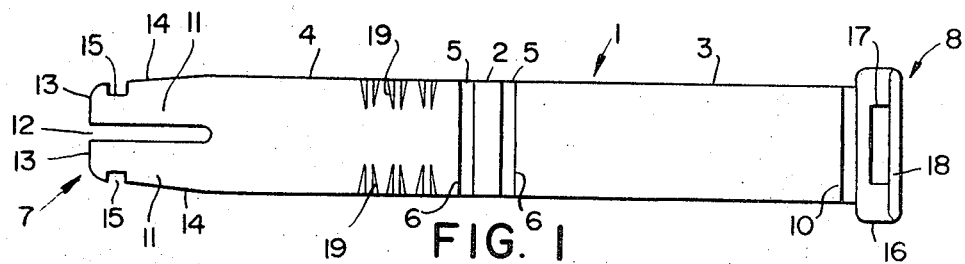
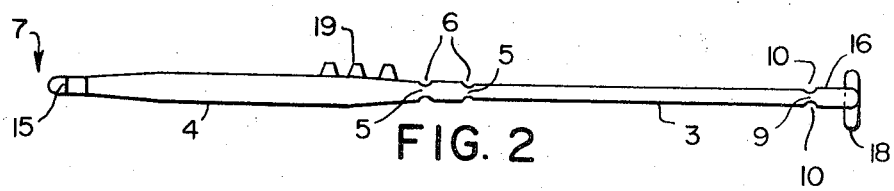
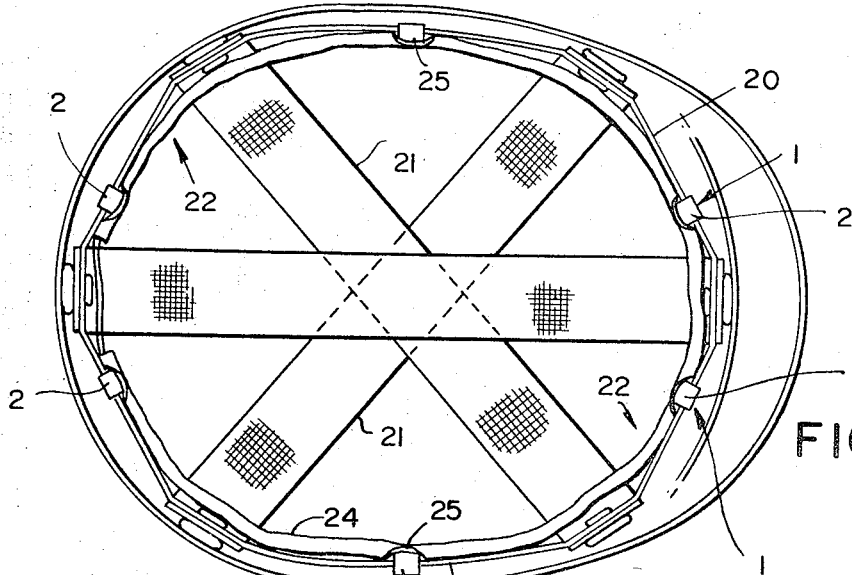
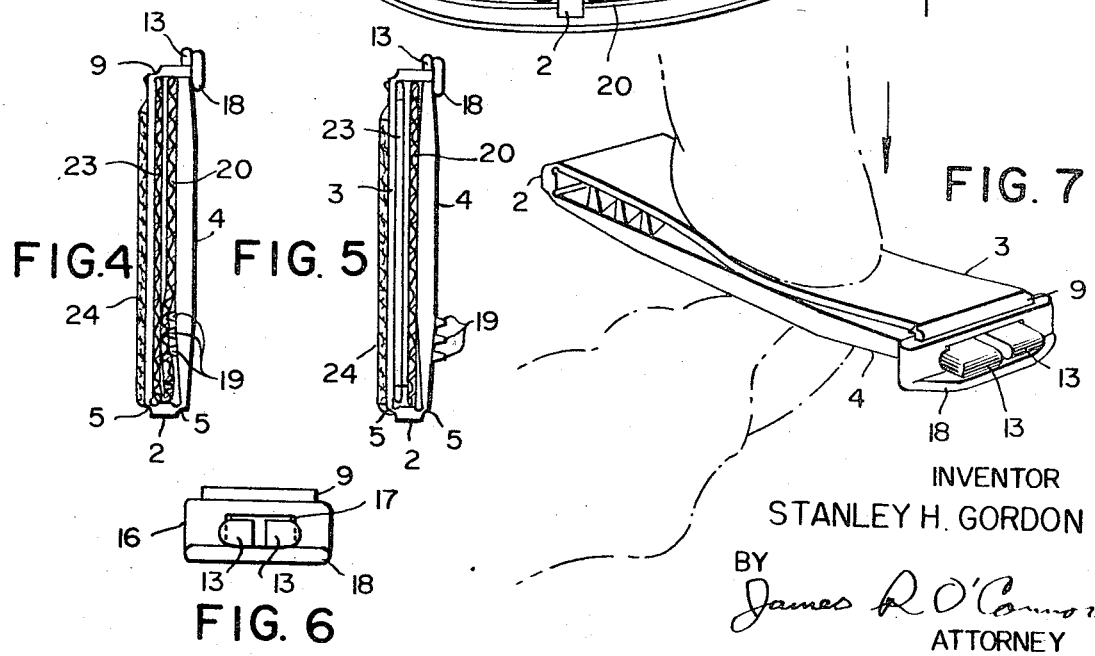
INVENTOR
STANLEY H. GORDON

3,551,965
CLIP
Stanley H. Gordon, Winchester, Mass., assignor to United-Carr Incorporated, Boston, Mass., a corporation of Delaware
Filed Dec. 19, 1968, Ser. No. 785,082
Int. Cl. A42c 5/00; A44b 21/00
U.S. Cl. 24—248                                2 Claims

ABSTRACT OF THE DISCLOSURE

A clip in the form of a unitary strip of synthetic plastic material is adapted to be bent on itself in more than one direction and locked to provide a closed, loop-type fastening. One end of the strip carries a resilient, locking plug and the other end carries a socket which snappedly mates with the plug to effect the lock. The strip embodies multiple hinges which provide for substantially right angle bends at the ends of the loop when it is in the locked condition.

DESCRIPTION OF THE PRIOR ART

In the past, clips utilized in the manner of the present invention have been formed from both springy sheet metal and synthetic plastic with the latter material having become predominant in recent years. Known clips formed from either metal or plastic have been used as bag fasteners, harness clamps, identification tag holders, coiled cord and rope keepers, etc., to name but a few familiar applications. The sheet metal clips are usually preformed in a semiclosed condition, i.e., they have an acute angle bend which is decreased at final closure. The plastic types are usually a flat unitary strip which is bent on itself through an angle of at least 90 degrees and in many instances an angle of 180 degrees or more to effect the closure. Regardless of the base material or the extent of bending to effect the closure, many of the known clips are characterized by a continuous bend which acts as a hinge at the integral portion of the the loop and a tendency to immediately spring open if the locking means is released. Because of these characteristics the designers have incorporated locking means which function in response to or reliance on the tendency. Thus, to complete the closure, the clips are bent or looped through an angle in excess of the included angle of their final closure attitude to permit a locking tab to pass through the enlarged oprtion of a keyhole-type slot in a socket or to forcibly pass a tab or finger over a resilient knuckle or shoulder. Upon subsequent release of the bending pressure the locking tabs spring up into a narrower extension of the keyhole slot or against the under surface of the knuckle or shoulder and the clip in effect biases itself into the locked condition.

One important disadvantage in the aforementioned constuctions is that pressures or forces acting on the clip when in use which are in excess of the spring open bias described above and which tend to further close the loop, i.e., decrease the included angle at the bend, often precipiate unintentional release of the clips. To eliminate the possibility of accidental release, other known designs have incorporated locking means which render the clips virtually nonreleasable. In other words the clips must be destroyed usually by cutting the strip, to effect a release. These so-called "one-time-use" type of clips are frequently employed as identification tag holders in hospitals and laboratories wherein accidental unlocking of a clip and the loss of the tag identifying blood specimens and other test samples, etc., cannot be tolerated.

As will become evident from a reading of the detailed description of the preferred embodiment which follows hereinafter a principal objective of my invention is to provide a slip which substantially eliminates the possibility of unintentional unlocking; but at the same time is capable of being deliberately released without destruction. Further, I have sought to provide a clip which presents a very low, flat profile in its closure attitude, thereby making it adaptable for use in situations where space limitations are critical and/or where it is considered highly undesirable for the clip to present outboard projections or overhanging ends. To accomplish the above recited objectives it was necessary to design a clip embodying structural features not found in known analogous fasteners and the disclosed device is therefore seen to represent a definite advance in the art when considered in the light of the prior art clips above described.

SUMMARY OF THE INVENTION

A clip formed as a unitary strip of synthetic plastic material which can be bent on itself in one given direction or the reverse direction and locked to effect a closed loop-type fastening has an intermediate section and a pair of end sections hinged to the intermediate section whereby said end sections may be bent into closely overlying relationship, a locking plug carried by one of the end sections and a socket hinged to the other of the end sections for snappedly receiving and releasably retaining the locking plug. In the closed condition the intermediate section and the socket lie at substantially right angles to the end sections of the strip, and the locking engagement between the plug and socket is a lateral snap engagement which is unaffected by further movement of the end sections about the hinges from their normal closure attitude.

BRIEF DESCRIPTION OF THE DRAWINGS

FIG. 1 is a top plan view of the clip according to the invention in its fully opened condition;

FIG. 2 is a side elevation of the open clip;

FIG. 3 is a plan view of a safety hat looking into the shell toward the crown wherein a plurality of clips according to the invention are utilized to secure the headband to the suspension harness of the hat;

FIGS. 4 and 5 are enlarged cross sectional views of the headband and fixed peripheral webbing strap of the suspension harness secured by the clips, with the latter depicted in side elevation;

FIG. 6 is an end view of the clip in the closed condition; and

FIG. 7 is a perspective view of the clip in the closed condition depicting the end sections thereof being pinched toward one another.

DESCRIPTION OF THE PREFERRED EMBODIMENT

The clip 1 is a molded, unitary strip of synthetic plastic material, for example, polypropylene or an acetal resin and includes an intermediate section 2 and a pair of end sections 3 and 4, all of which sections are generally flat. The end section 4 is considerably thicker and, therefore, somewhat more rigid than the end section 3. The length of the intermediate section 2 is substantially less than the width of either of the end sections.

The end and intermediate sections are connected by the thin webs 5, defined by pairs of opposed, spaced, transversely extending grooves 6, which act as hinge connections between the end and intermediate sections. In the preferred embodiment the webs 5 are formed by molding the grooves 6 in the strip, but it is envisioned that the grooves might be coined in the strip or formed by repeated flexing of the strip along lines defining the desired axes of bending.

The end section 4 carries a resilient locking plug 7 at its end remote from the intermediate section 2 and the end section 3 carries a socket 8 at its remote end, which socket is hinged to the said end section by a thin web 9 defined by opposed transverse grooves 10. The locking plug 7 includes a pair of resilient fingers 11 spaced from each other by a longitudinal slot 12 extending from the free ends 13 of the fingers rearwardly toward the intermediate section 2. Each of the fingers 11 has an outboard edge 14 tapering inwardly toward its free end and each has a laterally opening notch 15 formed in said outboard edge slightly rearwardly of its free end. The socket 8 includes an essentially rectangular frame 16 having a through generally rectangular slot 17 formed therein and a transverse bar 18 extending across the outer end of the frame. The thickness of the frame 16 is approximately equal to the width of the notches 15 in the fingers 11, and the length of slot 17 is approximately equal to the distance between the inner walls of the notches.

In the disclosed embodiment, a plurality of ramped projections 19 extend outwardly from one surface of the end section 4. The projections are grouped in generally parallel rows and the apices of the opposed projections point in opposite directions, i.e., toward the lateral outboard edges of the end section adjacent each row. While the projections and their location, configuration and orientation are significant features of the preferred embodiment when considered in the light of the safety hat application described hereinafter, it is anticipated that clips within the scope of the invention might be devoid of the projections or have a greater number of projections or have projections extending from one or more of the other surfaces of the end sections depending on the ultimate usage contemplated for the fastener. The projections, when present, are spaced to fit the weave of the material to be engaged, so that each tooth will engage a strand, for example, where the material is a coarse web fabric.

The safety hat depicted in FIG. 3 is the well-known type employed by the military as a helmet liner and includes a support harness structure having a fixed peripheral webbing strap 20, and a plurality of adjustable cross straps 21 which intersect to form a crown for supporting the liner on the wearer's head. The ends of the cross strap and the peripheral strap are overlapped and secured to each other and the shell of the hat. The adjustable headband 22 is secured to the fixed peripheral strap 20 by a plurality of the clips 1 to complete the support harness structure. The cross straps 21 and the fixed peripheral strap 20 are of the usual web-cloth type and the headband 22 has a web-cloth backing strip 23 (see FIG. 4) and a natural or imitation leather strap 24 stitched to the inner face of the backing strip. At selectively spaced intervals the stitching is interrupted to provide open-ended pockets 25 between the backing strip 23 and the leather strap 24.

As best seen in FIGS. 4 and 5 the clip 1 is assembled with the headband by threading the end section 3 into a pocket 25 so that the socket 8 will extend beyond the end of the pocket remote from the rim of the safety hat as viewed in FIG. 3. The headband is thereafter secured to the peripheral strap 20 by looping the end section 4 of the clip over the latter and bending the said end section toward end section 3 about the hinges 5 and generally simultaneously bending the socket 8 about the hinge 9 to bring the aperture 17 into registration with the end of the locking plug 7. As the socket is bent toward the plug, the free ends 13 of the fingers 11 engage the undersurface of the crossbar 18 and the plug is automatically cammed into the socket. As the plug passes into the aperture 17, fingers 11 are initially pinched toward each other until their free ends 13 clear the remote face of the frame 16 whereupon they spring apart and the vertical walls of the frame defining the aperture 17 seat in the notches 15 in the fingers. Since the width of the aperture 17 is approximately equal to the thickness of the fingers 11, vertical play (as viewed for example in FIG. 6) between the plug and socket when engaged is virtually nonexistent.

FIG. 7 is indicative of the fact that bending or squeezing of the end sections 3 and 4 toward each other, i.e. beyond their normal closed attitude, has no effect on the snap lock connection between the plug and socket. The aforementioned feature of the device takes on added significance when one considers that the reactive force to the pressure of the headband on the wearer's head when the safety hat is in use will tend to squeeze the end section of the clip together in the manner of the diagrammatic fingers dipcted in FIG. 7. As mentioned in the above discussion of the prior art, previously known clips are subject to unintentional release by similarly acting forces. Thus, to intentionally release the clip 1 the socket 8 must be forcibly bent away from the plug 7, i.e., in a counterclockwise direction as viewed in FIG. 4, whereby the fingers 11 are again pinched toward each other to permit withdrawal through the aperture 17. The unlocking may be accomplished by a moderate finger pressure on the crossbar 18 in the appropriate direction whereby the headband is rendered easily detachable for purposes of cleaning, repair or replacement, etc.

As previously noted, the headband 22 is circumferentially adjustable for proper sizing to the heads of different individuals and often must be frequently readjusted by one individual due to slippage in the adjusting buckle or stretching of the band. However, accidental slippage of the band relative to the peripheral web strap 20 is considered highly undesirable. Considering these functional requirements and again having reference to FIGS. 4 and 5 the reader will observe that in the former the clip is so oriented with respect to the headband that closure about the peripheral strap 20 causes the projections 19 to bite into the latter thereby inhibiting relative movement between the bend and the strap. The illustrated construction wherein the intermediate section 3 of the clip is relatively thin and flexible whereas the section 4 is thicker and relatively rigid contributes to improved biting action by the projections 19 since the thinner section 3 is drawn tight under tensile load when the plug 7 is cammed into the socket 8. This tension creates a constant pressure forcing the said sections 3 and 4 toward each other and thereby presses the projections into the webbing material. Since the ends of the respective rows of projections point in opposite directions, one row will be deeply embedded in the webbing fabric responsive to relative movement between the band and the strap in either clockwise or counterclockwise direction as viewed in FIG. 3. However, since one or two clips oriented according to FIG. 4 will effectively prevent slippage the remaining clips may be oriented as depicted in FIG. 5 so that the projections 19 face the inside wall of the safety hat shell. With the clips so arranged only one or two need be released for sizing adjustment of the headband since the strap 20 will slip easily against the smooth inboard surface of the end section 4 of clips oriented according to FIG. 4. Obviously the remaining clips might be manufactured without projections, in which case the orientation or direction of bending would be immaterial since all surfaces would be smooth and permit relative sliding adjustment of the headband.

When the clip is in the closed condition the bends at the hinges 5 and 9 are substantially right angled bends. The intermediate section 2 lies substantially between planes defined by the opposed facing surfaces of the end sections. The clip presents a low flat profile making it particularly useful in situations where space limitation is critical, such as the disclosed safety hat harness assembly. The overhang of the respective ends of the clip at the plug and socket connection is practically negligible. The end section 3 presents a smooth, flat surface beneath the leather strip 24 of the headband. The plug and socket connections in the disclosed safety hat application lies close to the shell of the hat, in which location it is protected from accidental engagement and release. When the clip is oriented as depicted in FIG. 5 the projections 19 face the shell of the hat and will not pinch or otherwise irritate the head of the wearer. Thus the design objectives set forth earlier in this specification have been accomplished.

I claim:

1. A clip formed as a unitary strip of synthetic plastic material which is adapted to be bent on itself in more than one direction and locked to provide a closed loop-type fastening, said clip comprising a pair of end sections joined by a hinge connection whereby said end sections may be bent into closely overlying relationship about said hinge connection, a locking plug carried by one of said end sections at its end remote from said hinge connection, and an apertured socket hinged to the remote end of the other end section for snappedly receiving and releasably retaining said locking plug, said socket including means for engaging said locking plug and camming it into the aperture in said socket responsive to bending of said socket toward said one end section when said end sections are bent into closely overlying relationship.

2. A clip according to claim 1 wherein said means is a cross bar extending transverse the outer end of said socket, said crossbar having an inboard surface disposed adjacent the aperture in said socket.

References Cited

UNITED STATES PATENTS

| | | | |
|---|---|---|---|
| 2,380,430 | 7/1945 | Hallock | 24—259.1UX |
| 2,818,871 | 1/1958 | Beaudry | 24—30.5PB |
| 3,203,067 | 8/1965 | Elsner | 24—265RL |
| 3,315,324 | 4/1967 | Ward | 24—30.5PB |

FOREIGN PATENTS

| | | | |
|---|---|---|---|
| 1,368,233 | 6/1964 | France | 24—16PB |

DONALD A. GRIFFIN, Primary Examiner

U.S. Cl. X.R.

2—190; 24—30.5